United States Patent [19]

Slocum

[11] Patent Number: 4,765,754
[45] Date of Patent: Aug. 23, 1988

[54] INCLINED CONTACT RECIRCULATING ROLLER BEARING

[75] Inventor: Alexander H. Slocum, McLean, Va.

[73] Assignee: The United States of America as represented by the Secretary of Commerce, Washington, D.C.

[21] Appl. No.: 48,848

[22] Filed: May 12, 1987

[51] Int. Cl.⁴ .............................................. F16C 29/06
[52] U.S. Cl. .......................................... 384/44; 384/45
[58] Field of Search .............................. 384/7, 43–45; 464/168

[56] References Cited

U.S. PATENT DOCUMENTS

| | | | |
|---|---|---|---|
| 4,302,059 | 11/1981 | Teramachi | 384/44 |
| 4,396,235 | 8/1983 | Teramachi | 384/44 |
| 4,496,197 | 1/1985 | Kwon | 384/44 |
| 4,553,793 | 11/1985 | Teramachi | 384/45 |
| 4,558,910 | 12/1985 | Teramachi | 384/44 |
| 4,563,045 | 1/1986 | Katayama | 384/44 |
| 4,577,913 | 3/1986 | Metelski | 384/44 |
| 4,636,094 | 1/1987 | Teramachi | 384/44 |

FOREIGN PATENT DOCUMENTS 58-622  1/1983  Japan ................................. 384/44

*Primary Examiner*—Stanley N. Gilreath
*Assistant Examiner*—Thomas R. Hannon
*Attorney, Agent, or Firm*—Thomas Zack; Alvin Englert; Akin T. Davis

[57] ABSTRACT

A linear recirculating roller bearing is disclosed where the rollers travel in an inclined groove where the non-loading rolling groove is parallel to the loading roller groove. In the preferred embodiment four sets of rollers are provided which are able to bear loads from any direction. The angle of the rollers with respect to the bearing is dependent on the materials used and the overall dimensions of the system so that the bearing gap expands, due to temperature changes, at the same rate as the rollers.

5 Claims, 3 Drawing Sheets

INCLINED CONTACT RECIRCULATING ROLLER BEARING

BACKGROUND OF THE INVENTION

The present invention relates to a narrow profile linear recirculating roller bearing for guiding a linear movement of a machine by rolling friction with a reduced resistance to movement. More particularly, the invention concerns a recirculating bearing which can be made from different types of materials which is not over constrained even when subjected to thermal expansion of rollers and the race.

Many machine tools and precision instruments require a bearing component to move linearly along one axis with minimal resistance. These bearings must normally be fully constrained bearing, that is one which is able to withstand a load in all other directions. Fully constrained bearings are usually preloaded whereby the rollers or other bearing contact surfaces are tightly clamped between the roller guide means. Thermal strains due to expansion can significantly alter the bearing's geometry and preload which can lead to reduced bearing performance, accuracy and useful life.

Many machine tool systems use hardened steel linear bearing assemblies which are bolted to cast iron structures. In this type of system however the coefficients of thermal expansion are different resulting in warping of the components at different temperatures. Thus a machine warm up time is necessary to bring the unit to a proper operating temperature in order to have the bearing function properly. Depending on the machine this may take several hours and thus the need for a warm up time is undesireable for those systems not intended to run 24 hours per day.

Other machine tool systems have used hardened steel for bearing components and aluminum for the structural components. Aluminum's thermal conductivity is five times greater than iron alloys which greatly decreases any required warm up time and decreases the potential for the occurrence of hot spots. However, as the thermal expansion coefficient of aluminum is twice that of steel severe warpage problems may result. Aluminum is also desirable as a structural material because of its light weight, high damping, and ease of machining.

An additional alternative approach to avoiding the adverse affects of thermal strains has been to use materials with a low thermal expansion coefficient and 36% nickels (sold under the trade name Invar). These materials have not proven to be satisfactory due to the expense and difficulty of machining. Additionally, these alloys are seldom hard enough for use as the wear surface, unless fluid film bearings are used.

Recirculating roller bearings are known in the art as disclosed in U.S. Pat. No. 4,302,059 to Teramachi. Disclosed therein is a bearing unit which is intended to reduce the need for turning and grinding operations during production. The bearing unit comprises a bearing body having a pair of downward projections at opposite sides thereof. A pair of parallel sectionally right-angled V-grooves are formed on the inclined load-carrying wall surfaces on the inner side of the projections and a pair of sectionally square U-shaped grooves are formed on the non-load-carrying wall surfaces on the outer sides of the bearing body in parallel relation with the V grooves. A track shaft having cooperating V grooves opposite the bearing body receives a plurality of rollers, alternately shifted 90°. Retainers fixed on the projections form endless roller guide tracks in cooperation with the V and U-grooves. This system, however, is effected by thermal expansion. Additionally, because the bearing relies on the diameter of the roller being equal to the length, the load capacity is limited.

Another example of recirculating roller bearings is shown in U.S. Pat. No. 4,396,235 to Teramachi. This arrangement comprises a bearing unit body having a flat non-loading roller groove where the rollers are essentially horizontal. Two inwardly inclined projections with outer non-loading portions and inner loading portions are also provided. The roller grooves are formed with curved end parts to ensure circulation of the rollers. A track shaft cooperates with the inner grooves to receive rollers adapted to circulate through the upper and lower grooves and the loading and non-loading portions of the projections. This arrangement is also incapable of compensating for thermal expansion.

If different materials are used in the design of these bearings, as the system temperature changes, the distance between the surfaces that the roller contact will change. This causes a non-predictable non-linear change in the preload and bearing gap which will cause a non-linear response throughout the rest of the structure. For economic and manufacturing reasons most machine tools have their main structure made from cast iron and the high stress and wear areas made from hardened steel. These two materials have coefficients of expansion differing by as much as 20% depending on the alloy used.

SUMMARY OF THE INVENTION

The present invention is directed to a recirculating roller bearing which has joint stiffness and is fully constrained for use in precision machines. Ideally, a high accuracy, fully constrained, linear bearing will have no bearing gap, a low bearing coefficient of friction, high stiffness and load carrying capabilities, a preload which is unaffected by temperature changes, minimal size and complexity and unlimited linear travel. For extreme accuracy and simplicity, flat bearing surfaces which can be lapped have been found to be preferred over curved bearing surfaces.

The present invention provides a bearing design and a method of tailoring the bearing to enable different materials to be used without interferring with the effective operation of the bearing. The bearing made according to the present invention has each of the above desirable characteristic. By coordinating the materials to the dimensions of the bearing unit the change in the bearing race due to thermal expansion can be coordinated to the expansion of the roller bearing whereby no significant bearing gap change occurs. This is comparable to a bearing system which is made of a single material whereas the present invention provides for the use of different materials for each component. This bearing has the advantage that the roller length to diameter ratio is not limited but can be chosen according to the required stiffness, size and load supporting characteristics as needed.

The method of coordinating the bearing design with the materials used takes into account the width of the bearing plates and the thermal expansion coefficients which will affect the bearing gap. By considering the dimensions of the bearing components and the expansion coefficients of the various components the bearing angle can be determined which will prevent any net gap change with changes in temperature.

The bearing unit is of the recirculating type and designed to be easy to manufacture at a low cost and capable of providing accurate linear movement. The same design principles can also be applied to non-roller type bearings. The bearing unit comprises a fixed base supporting a pair of upper and lower V-shaped grooves as the bearing surface. A carriage assembly moves in a linear motion with respect to the base and comprises essentially a pair of steel bearing plates which support the roller bearings. The bearing plates are provided with a squared U-shaped groove to retain the rollers during the non-loading phase. A V-shaped groove is situated at the longitudinal edge of the bearing plate such that the rollers are parallel to the rollers in the U-shaped groove and cooperate with the V-shaped groove of the base. End caps having a U-shaped groove are attached to the bearing plate to form an endless track ensuring the circulation of the rollers. The rollers within each endless track remain parallel to each other at all times and are inclined with respect to the plane of the bearing unit. The angle of the rollers is dependent on the dimensions of the base and bearing plate and the expansion coefficients of these components to result in a bearing unit with no net gap change and can be preloaded to desired specifications.

DESCRIPTION OF THE PREFERRED EMBODIMENTS

Figure 1:
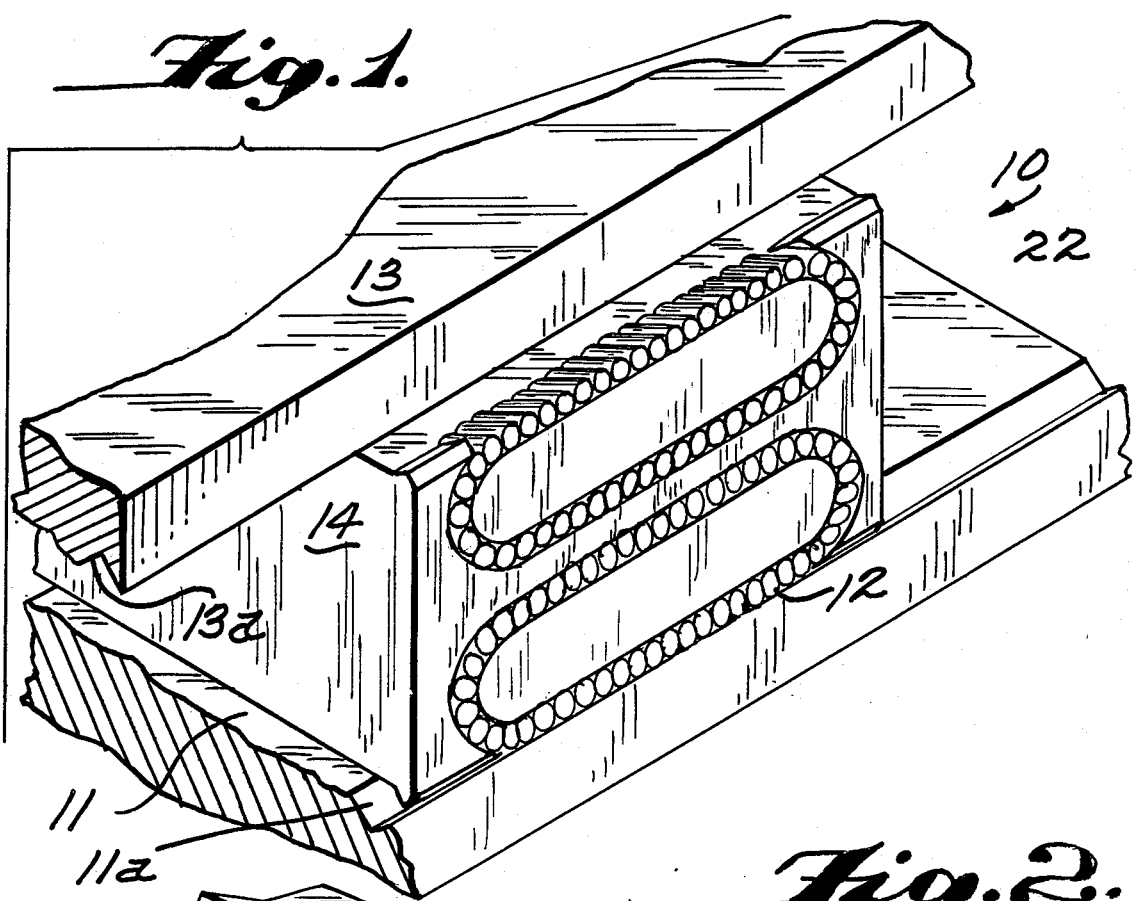
FIG. 1 is a perspective view of a first embodiment of the bearing assembly.

One embodiment of the recirculating roller bearing unit is designated 10 as shown in FIG. 1. The stationary base 11 is provided with a V-shaped groove 11a which serves as the load bearing region of the base and receives the rollers 12. An upper rail member 13 also having a V-shaped groove 13a which faces the groove 11a of the base 11 is also provided. This upper member is secured to the base in an appropriate manner. A roller carriage 14 supporting the rollers 12 is positioned between the base 11 and the upper member 13 and is reciprocable in a linear fashion.

Figure 2:
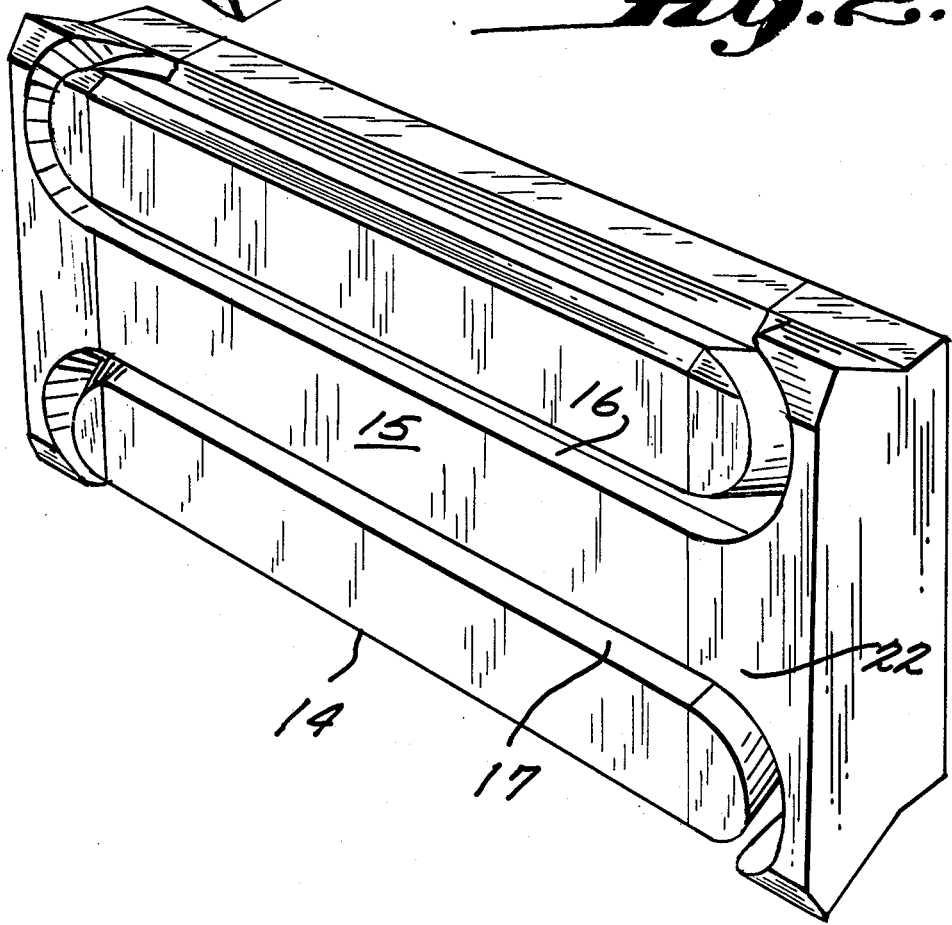
FIG. 2 is a perspective view of the main carriage body with the end caps attached.
Figure 3:
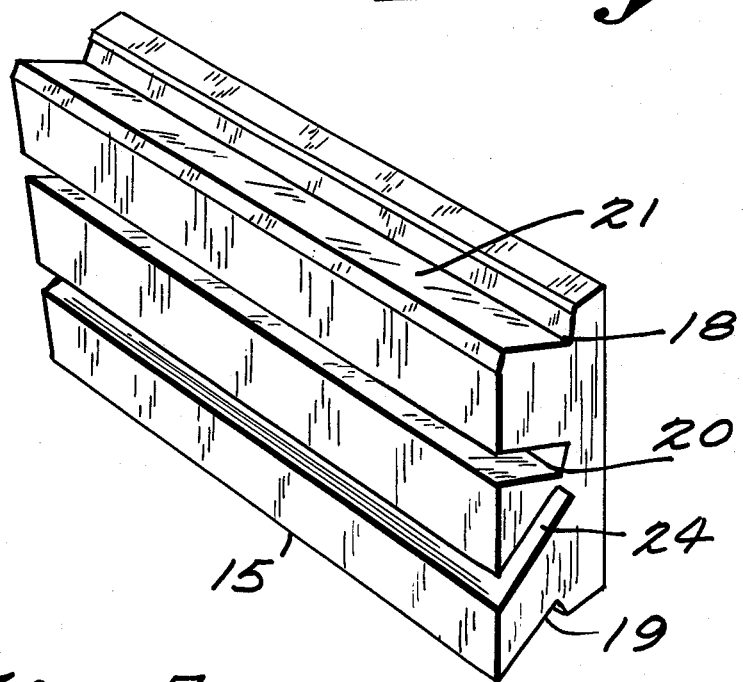
FIG. 3 is a perspective view of the main carriage body.
Figure 4:
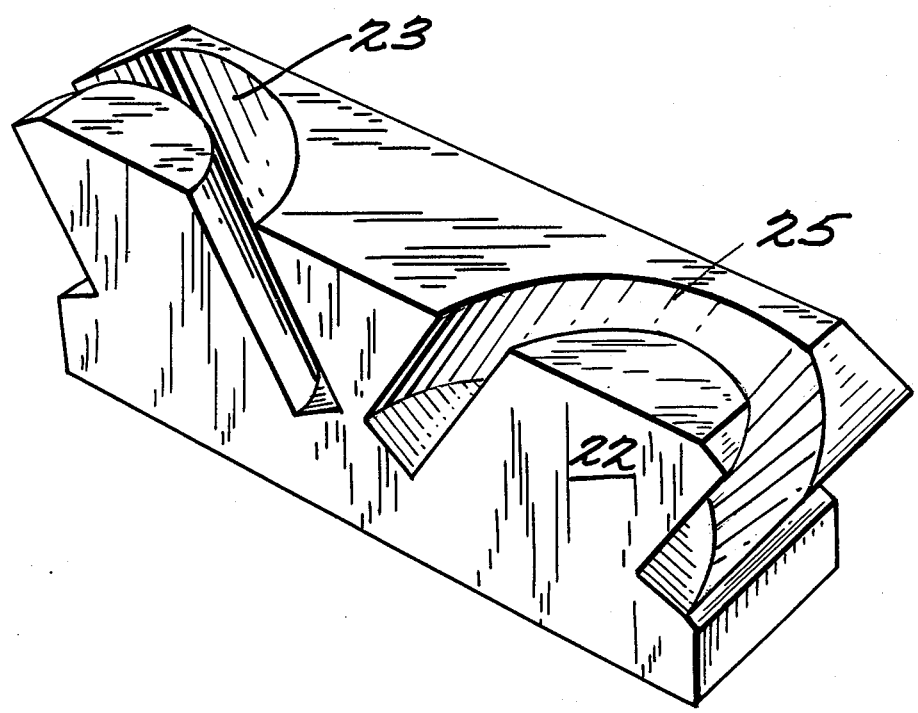
FIG. 4 is a perspective view of an end cap.

The roller carriage 14 as shown in FIG. 2 includes a main carriage body 15 which receives a plurality of rollers within each of upper and lower rollers within upper and lower endless tracks designated generally as 16 and 17, respectively. Referring to FIG. 3 the upper endless track is formed by a V-groove 18 and a squared U-groove 20. As can be seen from FIG. 3 the sides of the U groove are parallel to the face 21 of the V-groove. End caps 22 which are attached to the two ends of main carriage body 15 are each provided with a U-shaped groove 23 as best shown in FIG. 4. When the end caps 22 are attached to the main carriage body 15, the U-shaped groove 23 connects the V-groove 21 with the U-groove 20 as shown in FIG. 2 thereby forming the upper endless track 16. The rollers 12 when placed in the endless track 16 are able to circulate from the V-groove 18 to the U-groove 20. The V-groove 19 has a corresponding U-groove 24 similar to groove 20. Likewise each end cap 22 is provided with a U-shaped groove 25 similar to groove 23 to ensure circulation of the rollers from the V-groove 19 to the U-groove 24. The walls of the V-grooves are essentially at right angles.

Figure 5:
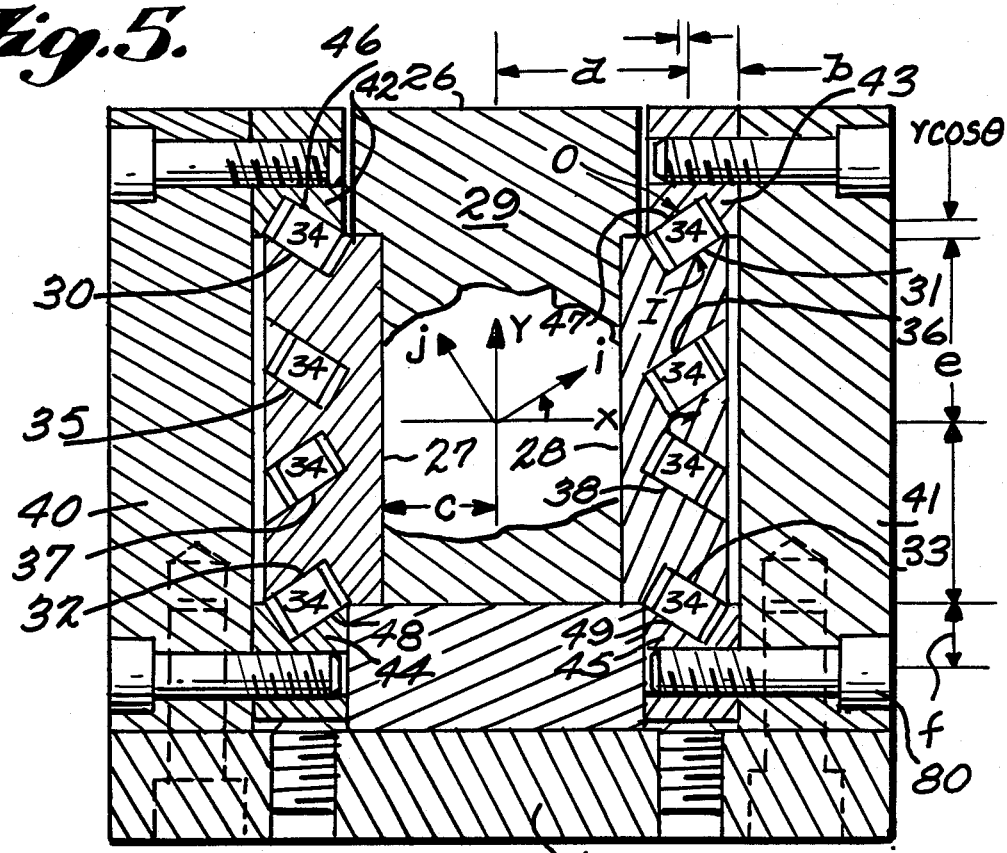
FIG. 5 is a cross sectional view of a second embodiment.

A slightly different embodiment of the base member is shown in FIG. 5. In this embodiment a carriage incorporates a pair of opposing roller carrying plates 27 and 28 supported on a block member 29. The plates 27 and 28 are essentially identical to the carriage 15 of FIG. 4. The plates 27 and 28 each have an upwardly directed right angle V-groove 30, 31 and a downwardly directed right angle V-groove 32, 33. The V-grooves receive rollers 34 and form the load-carrying regions of the bearing assembly. Squared U-shaped grooves 35, 36, 37, and 38 are provided in plates 27 and 28 and together with end cap members (not shown) form four endless tracks for the rollers. The end cap members are essentially identical to those shown in FIG. 4. The U-grooves form the non-load-carrying region of the endless track.

The stationary portion of the bearing assembly of the embodiment of FIG. 5 includes a base plate 39 and upwardly extending parallel side members 40 and 41. Each side member includes an upper rail 42 and 43 and an opposing lower rail 44 and 45. The upper rails 42, 43 each have a V-groove 46 and 47 respectively cooperating with the upper load-carrying V-grooves 30, 31 of the plates 27 and 28. The lower rails 44 and 45 also are provided with V-grooves 48, 49 which cooperate with the V-grooves 32, 33 of the plates 27 and 28.

In operation the rollers 34 are positioned in each of the V-grooves such that the rollers in the upper V-grooves 30, 31 are angled upwardly as shown in FIG. 5. The rollers in the lower V-grooves 32, 33 are angled downwardly. When the carriage assembly is moved linearly with respect to the base the rollers move between the opposing V-grooves and circulate through the non-load carrying U-groove in an essentially conventional manner for recirculating bearing units. Each of the U-grooves is angled such that the rollers within the U-groove are parallel to the rollers in the corresponding load-carrying V-groove.

The base member 39 is preferrably made of aluminum while the side members 40, 41 are made of aluminum. The rail members 42, 43, 44 and 45 are of a hardened steel suitable for carrying a load. The base 39 is sufficiently rigid such that the expansion coefficients of the rails will not produce a curvature of the base or rail.

The bearing unit having the above structure results in a fully constrained unit which requires only flat ground bearing races and can be preloaded.

When different materials are used in the bearing assembly the bearing gap can change resulting in the bearing freezing up. The present invention further provides a method of tailoring the dimensions of the assembly and the roller angle to the materials used to construct the assembly. To calculate the critical angle $\Gamma$ of the roller the following dimensions are required as shown in FIG. 5:

a = the distance from the mid-point of the block member 29 to the mid point of the roller 34;

b = the distance from the mid-point of the roller to the edge of the rails;

c = the distance between the mid-point of the block member 29 and the outer edge of the block member;

e = the distance between the mid-point of the plates to its upper edge;

f = the distance from the mid-point of the roller to the mid-point of the bolt 80 which attaches the rail to the side member 41;

$\alpha_1$ = the expansion coefficient of the rail and the roller;

$\alpha_2$ = the expansion coefficient of the side member 41;

$\alpha_3$ = the expansion coefficient of the block member 29;

r = radius of the roller;

point O = the mid-point of the load carrying face of the V-groove in the rails;

point I = the mid-point of load carrying face of the V-groove of the plates.

In order to determine the angle $\theta$ of the roller it is first necessary to transform the X and Y coordinates of the bearing assembly to the i and j Coordinate system where i is the axial direction of the roller and j is 90° thereto. Thus:

$$i = X \cos \Theta + Y \sin \Theta \quad (1)$$

$$j = -X \sin \Theta - Y \cos \Theta \quad (2)$$

The displacements of the V-groove of the rail from the point O due to thermal strains are:

$$\Delta X_o = (a+b)\alpha_2 - (b+r \sin \Theta)\alpha_1 \quad (3)$$

$$\Delta Y_o = (e+f)\alpha_2 - (f-r \cos \Theta)\alpha_1 \quad (4)$$

The displacement of the point O in the j direction, $\Delta G_o$, can be determined by substituting equations (3) and (4) into (2):

$$\Delta G_o = \alpha_1[b \sin \theta - f \cos \theta + r] + \alpha_2[(e+f) \cos \theta - (a+b) \sin \theta] \quad (5)$$

The displacements of point I of the plate 28 in the X and Y direction are respectively;

$$\Delta X_I = c\alpha_3 + (a-c+r \sin \theta)\alpha_1 \quad (6)$$

$$\Delta Y_I = (e - r \cos \theta)\alpha_1 \quad (7)$$

The displacement of the point I in the j direction $\Delta FI$ is determined by substituting equation (6) and (9) and (2):

$$\Delta G_I = -c\alpha_3 \sin \theta + \alpha_1 [(c-a) \sin \theta + e \cos \theta - r] \quad (8)$$

During thermal expansion or contraction of the rails and plates the displacement of points O and I must correspond to the expansion or contraction of the roller in order to avoid any net bearing gap change and prevent freeze-up of the bearing assembly. Thus for the bearing preload to remain constant the differences between the displacements of points O and I must equal the change in diameter of the roller, $$\Delta G_o - \Delta G_I = 2r\alpha_1 \quad (9)$$

Substituting equation (3) and (8) into (9) the critical angle $\theta$ can be determined:

$$\theta = \tan^{-1} \frac{(\alpha_1 - \alpha_2)(e+f)}{\alpha_1(b+a-c) - \alpha_2(a+b) + \alpha_3 c} \quad (10)$$

The critical angle was calculated for the center of the roller. The gap change as a function of position along the roller is found by substituting the following "new" values for a, b, e and f which were obtained from the geometric configuration of FIG. 5 into equation (10):

$$a_n = a + l' \cos \theta \quad (11)$$

$$b_n = b - l' \cos \theta \quad (12)$$

$$e_n = e + l' \sin \theta \quad (13)$$

$$f_n = f - l' \sin \theta \quad (14)$$

This substitution yields the original expression for the critical angle $\theta$. Thus the rollers will not have a linearly varying load applied along their lengths due to thermal effects.

Figure 6:
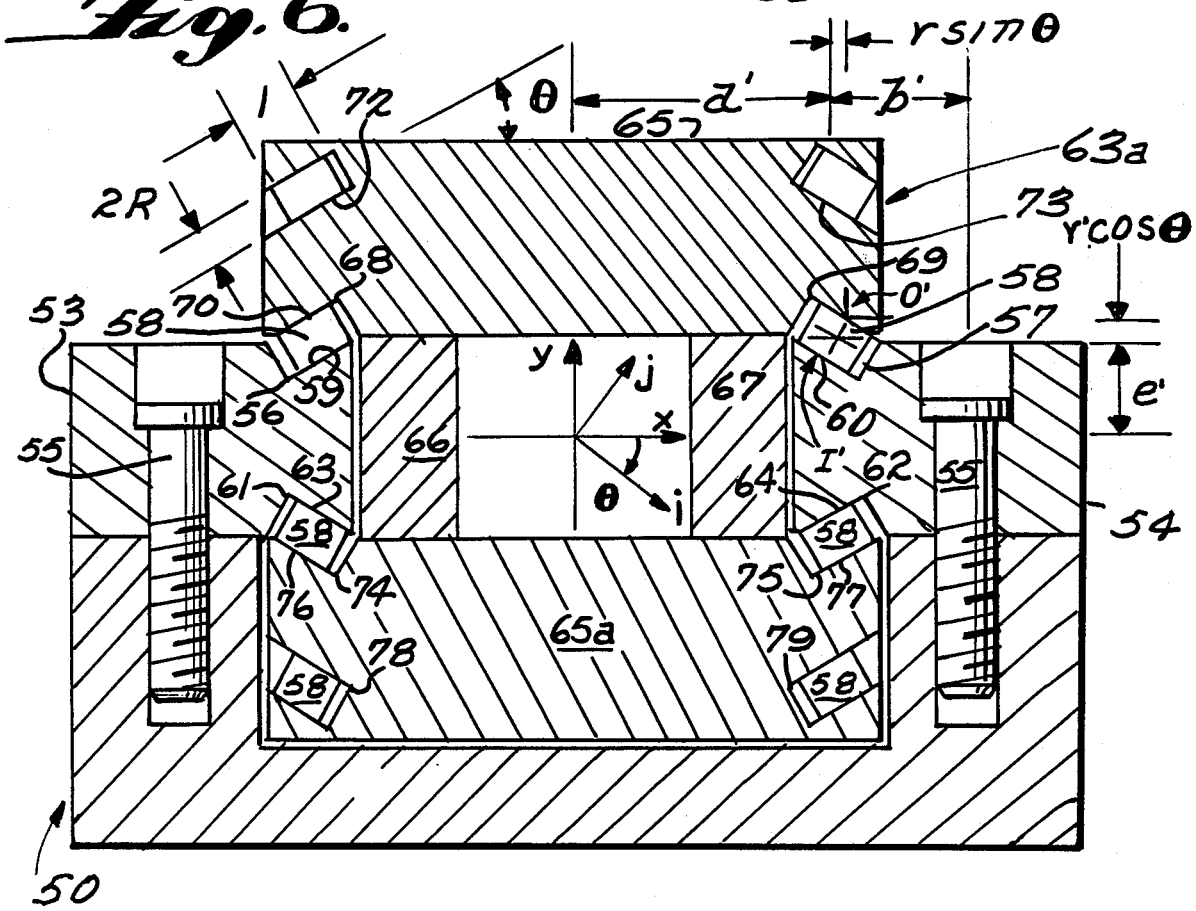
FIG. 6 is a cross sectional view of a third embodiment of the bearing assembly.

An alternative embodiment of the recirculating roller bearing according to the present invention is shown in FIG. 6. The bearing assembly includes a base 50 usually made of cast iron or aluminum. The base supports a pair of rails 53 and 54 made of hardened steel. The rails are secured to the base 50 by any suitable means such as bolts 55. Each of the rails projects inwardly toward the center of the base 50 and is provided with an upper V-groove 56 or 57 extending the length of the respective rail and receiving a plurality of rollers 58. The V-grooves have their inner faces as the load-carrying surfaces 59, 60 which contact the longitudinal edges of the rollers. The lower edge of rails are also provided with a downwardly open V-groove 61, 62 similar to V-grooves 56 and 57. Inner load-carrying faces 63 and 64 of the V-grooves contact the longitudinal edges of rollers 58.

The bearing carriage assembly is designated generally as 63a and comprises a pair of identical steel bearing plates 65 and 65a arranged above and below rails 53, 54. The bearing plates are separated by blocks 66 and 67. Two blocks are used instead of one so as not to impose thermal strains in the direction of the bearing plates.

The upper bearing plate 64 is provided with a pair of downwardly open V-grooves 68, 69 which receive the rollers 58 and which are positioned opposite the V-grooves 56 and 57. The outer face 70, 71 of each V-groove serves as the load bearing surface and is positioned opposite and parallel to the load bearing surfaces 59, 60 of the V-grooves 56, 57. A pair of squared U-shaped grooves 72, 73 is positioned outwardly of the V-grooves 68, 69 with the side walls being parallel to the load bearing surfaces 70, 71. The U-grooves 72, 73 serve as nonload bearing regions of the bearing plate. End cap members, not shown, similar to those shown in FIG. 4 are secured to the ends of the bearing plates. The end caps have U-shaped grooves to connect the U-grooves 72, 73 to the V-grooves 68, 69 respectively to ensure recirculation of the rollers. Because of the inclined load bearing surfaces and the inclined walls of the non-loading U-grooves the rollers tend to roll out of the grooves in the corners or end caps. To avoid this a cover plate, not shown, is provided on the side face of the bearing plates. Although the rollers will skid around the corners no significant wear is expected because there is no load applied to the rollers along the corners. Tolerance within the recirculating path is not critical.

The lower bearing plate 65 is essentially identical to the upper bearing plate 64 including V-grooves 74, 75 with load bearing faces 76, 77 opposite load bearing surfaces 63, 64.

Squared U-grooves 78, 79 are provided below the V-grooves with the side walls of the U-groove being parallel to the load bearing surfaces 76, 77. End caps are also provided to ensure recirculation of the rollers.

In operation the carriage moves linearly along the rails with the rollers engaging the load bearing surfaces of the V-grooves. The rollers move along the length of the V-grooves and around through the end caps to the non-load bearing U-groove.

This structure provides a recirculating bearing which is fully constrained and can be preloaded to desired specifications. By coordinating the angle of the load bearing surfaces and the roller with the dimensions of the bearing and the materials used, the bearing can be produced such that no net gap change results with a change in temperature.

To determine the optimum angle $\theta$ of the load bearing surfaces the following dimensions are required as shown in FIG. 6:

$a'$ = the distance from the mid-point of the bearing plate 63 to the center of the roller;
$b'$ = the distance from the center of the roller to the center of the bolt 55;
$e'$ = the distance from the mid-point of the rail to the center of the roller;
$\alpha'_1$ = the expansion coefficient of the rails; rollers and bearing plates;
$\alpha'_2$ = the expansion coefficient of the block members 66, 67;
$\alpha'_3$ = the expansion coefficient of the base 50;
$r'$ = radius of the roller;
point $O'$ = the point of the load bearing surface of the V-grooves 68, 69 at the midpoint of the roller;
point $I'$ = the point of the load bearing surfaces of V grooves 74, 75 opposite the mid-point of the roller;
all calculations are per °C.

It is first necessary to transform the the X and Y coordinates of the bearing assembly to the i and j coordinates of the roller where i is the axis of the rollers;

$$i = X \cos \Theta - Y \sin \theta \quad (15)$$

$$j = X \sin \Theta + Y \cos \theta \quad (16)$$

The displacements of the point $O'$ of the load bearing face on the X and y directions are respectively $$\Delta X_o' = (a' + r' \sin \Theta)\alpha'_1{}'' \quad (17)$$

$$\Delta Y_o' = (e'\alpha'_2 + r'\alpha_1' \cos \theta) \quad (18)$$

By substituting the equations (17) and (18) into (16) yields the displacement of point $O'$, $\Delta G_o'$ in the i direction;

$$\Delta G_o' = \alpha_1'(a' \sin \theta + r') + e'\alpha_2' \cos \theta \quad (19)$$

The displacements of point $I'$ in the X and Y directions are;

$$\Delta X_I' = (a' + b')\alpha_3' - (b' + r' \sin \theta)\alpha_1' \quad (20)$$

$$\Delta Y_I' = (e' - r' \cos \theta)\alpha_1' \quad (21)$$

By substituting equation (20) and (21) into (16) yields the displacement of the point $I'$, $\Delta G_I'$ in the i directions;

$$\Delta G_I' = \alpha_1'(e' \cos \Theta - b' \sin \Theta - r') + \alpha_3'(a' + b') \sin \Theta(a' + b') \sin \Theta \quad (22)$$

In order to have a preload remain constant over a range of temperatures the differences between the displacements in the i direction of the load bearing surfaces must be equal to the change in the roller diameter. Thus for the bearing preload to remain constant.

$$\Delta G_o' - \Delta G_I' = 2r'\alpha_1' \quad (23)$$

By substituting equation (19) and (20) into (23) yields the relationship for a preloaded bearing which is not temperature sensitive.

$$(a' + b')(\alpha_1' - \alpha_3') \sin \theta + e'(\alpha_2' - \alpha_1') \cos \theta = 0 \quad (24)$$

Solving for the critical angle $\theta$ yields:

$$\theta = \tan^{-1} \frac{e'(\alpha_1' - \alpha_2')}{(a' + b')(\alpha_1' - \alpha_3')} \quad (25)$$

As an example, consider $\alpha_2' = \alpha_3' = 10.8$ $\mu$/m°C. and $\alpha_1' = 23.6$ $\mu$m/m°C. If the materials are iron of the same phase then the coefficients of expansion should change equally with temperature. If $\alpha_1$ does not have the same temperature dependence the critical bearing angle $\theta$ is:

$$\theta = \tan^{-1}[e'/a' + b')] \quad (26)$$

For $\alpha = 30°$, $a' = 4.00$ cm and $b' = 2.00$ cm the measurement $e'$ for the rail can be found to be 3.46 cm.

The displacements parallel to the bearing gap and the relative transverse motion between points $O'$ and $I'$ in the $c'$ direction is $\alpha i$ $$\Delta i = \Delta i_o' - \Delta i_I' \quad (27)$$

$$\Delta i = (\alpha_1' - \alpha_3')(a' + b') \cos \theta + e'(\alpha_1' - \alpha_2')\sin \theta$$

The net transverse displacement per degree centigrade change in the system temperature based on the above values is:

$$\Delta c' = 88.7 \; \mu m/°C.$$

This displacement will require the rollers to adjust their longitudinal position. The effect of the rollers resistance to this movement will depend on the coefficient of friction between the roller and the rail. If the roller can re-establish its longitudinal position, then no net system loads will arise. Rolling motion allows the roller to easily establish a new equilibrium position.

The resulting inclined contact recirculating roller bearing has no net bearing gap change with changes on temperature. Although the above embodiments include rollers, a similar arrangement can be applied to sliding or fluid bearings. This has tremendous advantages for ultra precision machines which use fluid bearings for use in environments where it is necessary to control the temperature within 0.01° F. Additionally, the bearing design allows flexibility in the choice of materials used depending on the needs of the bearing. By altering the construction materials the structural dimensions and the thermal response time can be controlled.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A recirculating roller bearing for guiding a linear movement comprising a base having parallel upwardly extending side members, the side members having upper and lower rails extending the length of the side members and secured thereto by an attachment means, the upper rails having a lower face having a V-groove to receive a roller, said V-groove to receive a roller, said V-groove having an inner face serving as a load bearing surface, the lower rails having an upper edge having a V-groove with an inner face of the groove being a load bearing surface to contact a roller bearing, a carriage assembly comprising a pair of bearing plates disposed between each upper and lower rail, the bearing plate having a V-groove on its upper and lower surfaces as load bearing regions opposite the V-grooves of the rails and capable of receiving a roller bearing in a space formed by the opposing V-grooves, the upper and lower V-grooves of the bearing plates having cooperating U-grooves extending the length of the V-grooves acting as a non-load bearing flight for the rollers thereby forming an endless trace, the U-grooves having their side walls parallel to the respective cooperating load-bearing surface of the V-groove in the bearing plate such that the rollers within each endless trace are always parallel.

2. An inclined contact recirculating roller bearing for guiding a linear movement which experiences no net change in bearing gap with changes in temperature, the bearing being capable of being preloaded comprising a base having parallel upwardly extending side members, the side members having upper and lower rails extending the length of the side members and secured thereto by a suitable attachment means, the upper rails having a lower face having a downwardly directed V-groove, said V-groove having an inner face serving as a load bearing surface, the lower rails having an upper edge having an upwardly open V-groove with an inner face as a load bearing surface, a carriage assembly comprising a pair of bearing plates disposed between each upper and lower rails such that the carriage assembly is movable linearly with respect to the rails, the bearing plates having V-grooves opposite the V-grooves of the rails, the outer face of said V-grooves acting as load bearing surface, a space formed by the V-grooves of the bearing plate and the opposing V-groove of the rail being capable of receiving a plurality of roller bearings, the V-grooves of the bearing plates each forming part of an endless track for the roller bearing including a cooperating U-groove parallel to and extending the length of the V-groove and acting as a non-load bearing flight, the U-grooves having their side walls parallel to the load-bearing surface of the cooperating V-groove whereby the roller bearings within each endless track area always parallel, the angle of the load bearing surfaces with respect to the base being dependent on the physical dimension of the bearing and the expansion coefficients of its members such that no net bearing gap change occurs with a change in temperature.

3. The recirculating roller bearing according to claim 2 wherein the angle of the load bearing surfaces is determined by:

$$[\theta = \tan^{-1} \frac{(\alpha_1 - \alpha_2)(e + f)}{\alpha_1 (b + a - c)} - \alpha_2 (a + b) + \alpha_3 C]$$

$$\theta = \tan^{-1} \frac{(\alpha_1 - \alpha_2)(e + f)}{\alpha_1 (b + a - c) - \alpha_2 (a + b) + \alpha_3 c}$$

where $\theta$ is the angle of the load bearing surface, $\alpha_1$ is the expansion coefficient of the rails, bearing plates and roller bearings, $\alpha_2$ is the expansion coefficient of the side members of the base, a is the distance from the center of the carriage to the center of the roller bearing; b is the distance from the center of the roller bearing to the outermost edge of the bearing plate; c is the distance from the center of the carriage to the innermost edge of the bearing plate; e is the distance from the center of the bearing plate to the center of the roller bearing and f is the distance from the center of the attachment means securing the rails to the side members to the center of the roller bearing within the V-groove.

4. An inclined contact recirculating roller bearing for guiding a linear movement which experiences no-net change in bearing gap with changes in temperature, the bearing being capable of being preloaded comprising a base member having upright side members, a rail member secured to each side member by an attachment means, the rail members extending inwardly toward each other and having upper and lower faces provided with a V-groove with an innermost face of the groove acting as a load bearing surface for a carriage assembly, the carriage assembly comprising upper and lower bearing plates, the upper bearing plate having V-grooves extending longitudinally and opposing the upper V-grooves of the rails, the outer face of said V-groove of the bearing plate acting as a load bearing surface, a space formed between the opposing V-grooves being capable of receiving a plurality of roller bearings, the V-grooves in the bearing plate forming part of an endless track for the roller bearings, the endless track including a U-groove in the bearing plate parallel to and extending the length of the V-groove and acting as a non-load bearing flight, the U-groove having side walls parallel to the load bearing surface of the V-groove of the rail such that the roller bearing with an endless track the lower bearing plate having upwardly open V-grooves opposing the downward V-grooves of the rails, the outermost faces of said V-grooves acting as load bearing surface, a space formed by the opposing V-grooves capable of receiving a plurality of roller bearings, the lower bearing plate further having a U-groove parallel to the V-grooves, the walls of the V-grooves being parallel to the load bearing surface of the V-groove, the U-groove and the V-groove of the bearing plate forming an endless track, the carriage assembly being arranged such that when rollers are positioned between opposing V-grooves the carriage is capable of moving in a linear path.

5. The recirculating roller bearing according to claim 4 wherein the angle of the load bearing surfaces with respect to the base is determined by $$\theta = \tan^{-1}\left(\frac{e(\alpha_1 - \alpha_2)}{(a+b)(\alpha_1 - \alpha_3)}\right)$$

where $\theta$ is the angle of the load bearing surface;

a is the distance from the center of the carriage assembly to the center of the roller bearings situated between opposing V-grooves;

b is the distance from the center of the roller bearings situated between opposing V-grooves to the attachment means of the rail;

e is distance between the center of the rail to the center of the roller bearing situated between the opposing V-grooves; and the distance from the center of the carriage to the innermost edge of the bearing plate;

$\alpha_1$ is the expansion coefficient of the bearing plate and rails;

$\alpha_2$ is the expansion coefficient of the carriage assembly separated the upper and lower bearing plates;

$\alpha_3$ is the expansion coefficient of the base.

* * * * *